United States Patent [19]

Lambert

[11] 4,330,904

[45] May 25, 1982

[54] APPARATUS FOR SHUCKING SCALLOPS

[76] Inventor: William R. Lambert, 750 Scallop Dr., Port Canaveral, Fla. 32920

[21] Appl. No.: 175,295

[22] Filed: Aug. 4, 1980

Related U.S. Application Data

[62] Division of Ser. No. 39,767, May 17, 1979, Pat. No. 4,255,834.

[51] Int. Cl.³ .............................................. A22C 29/04
[52] U.S. Cl. ...................................................... 17/74
[58] Field of Search ................... 17/51, 74, 53, 48, 46, 17/71

[56] References Cited

U.S. PATENT DOCUMENTS

| | | | |
|---|---|---|---|
| 3,465,382 | 9/1969 | Meyer | 17/48 X |
| 3,562,855 | 2/1971 | Willis | 17/48 |
| 3,722,035 | 3/1973 | Hanks | 17/51 X |
| 3,988,805 | 11/1976 | Martin et al. | 17/48 |
| 4,141,114 | 2/1979 | Carlson | 17/48 X |

Primary Examiner—Willie G. Abercrombie

[57] ABSTRACT

Apparatus for shucking scallops by subjecting scallops while moving them along a directed path of travel to an elevated temperature zone to heat the scallops, and moving the scallops to cause them to release their meats from their shells while removing the released meats out of the elevated temperature zone in one direction and discharging the scallop shells in a second direction away from the released meats.

7 Claims, 8 Drawing Figures

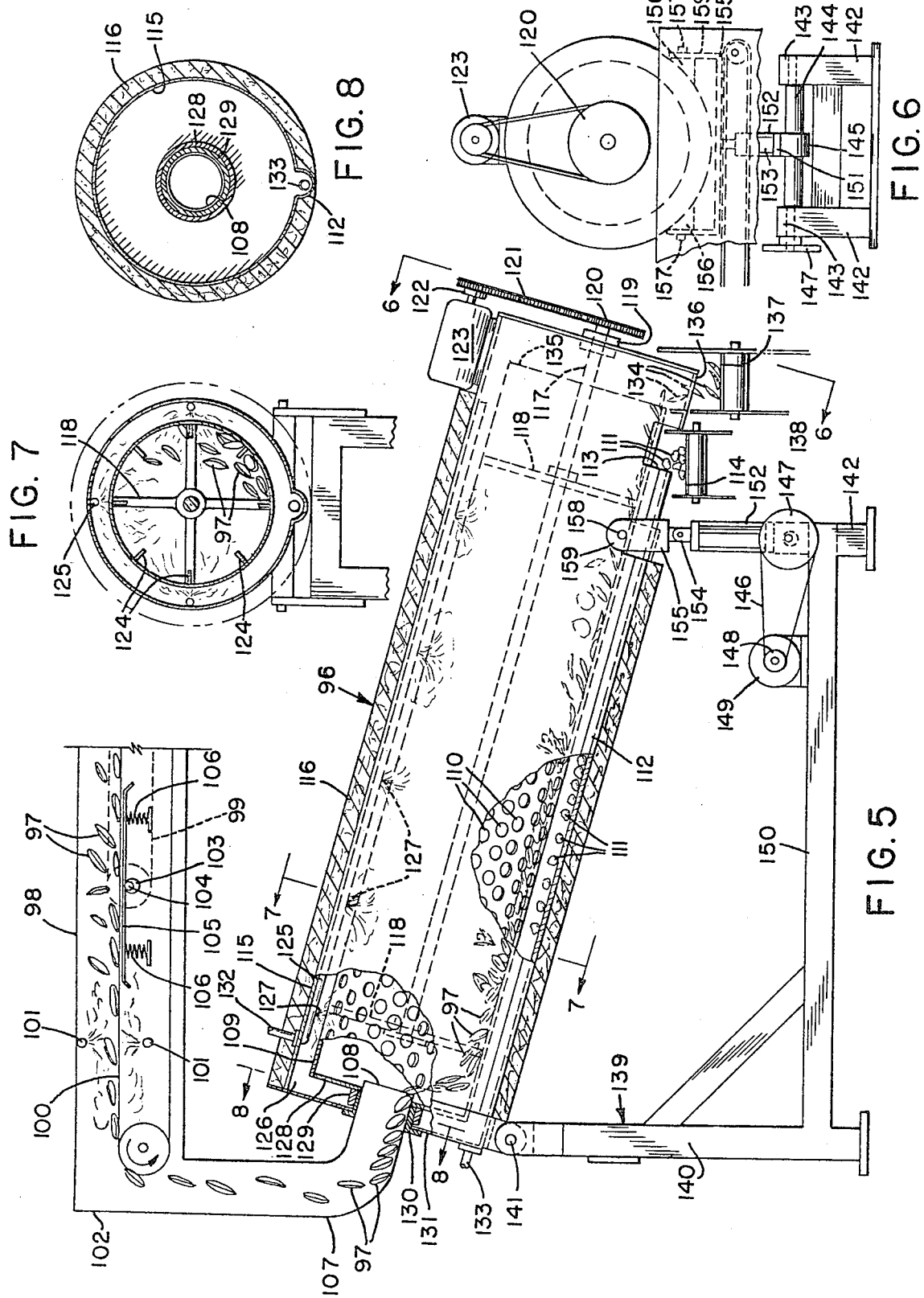

APPARATUS FOR SHUCKING SCALLOPS

This is a divisional application of Ser. No. 39,767 filed May 17, 1979, now U.S. Pat. No. 4,255,834.

BACKGROUND AND OBJECTIVES OF THE INVENTION

Harvesting scallops and shucking them by removing the scallop meats from the bivalve shells and then removing the viscera from the adductor muscle has been the subject of considerable activity for many years in order to provide a higher quality edible product which is more uniform while not appreciably increasing processing costs. Many scallops have insulating barnacles or other encrustations on the shells that create problems in shucking to remove the scallop meats. The size of scallops and their tenacity to be shucked will vary considerably depending upon geographical location, age, depth of water in which the scallops are located, water temperatures, among other variable factors including shell density.

In the larger varieties, such as sea scallops, shucking is usually performed manually at sea on board a ship with the shells and viscera being dumped overboard while in the smaller varieties, such as calico scallops, they are harvested at sea, and processed usually in land-based shucking and eviscerating processing plants.

It is highly likely that mechanized shipboard installations will incorporate equipment presently being used in land-based processing facilities to eliminate some of the objectionable problems of handling viscera, shells and pollution experienced in land-based operations. The resulting end product when processed within a short time after harvesting aboard ship should result in a higher quality end product. Frequently, however, many scallops die after harvesting before reaching the land-based processing plant while other scallops may deteriorate substantially before processing enroute to the processing plant. Also, it is well-known that scallops are considerably more difficult to shuck whether manually or mechanically. Usually a strong impact or shock is required to open a small, live scallop in order to separate the scallop meats from the bivalve shell. Various impacting or shocking methods have been employed with varying results. The harvested older scallops, whether dead or partially deteriorated, require less impact or shock to separate the scallop meat from the bivalve. In some procedures, a mass of scallops is subjected to elevated temperatures initially and then followed thereafter by a shock impact treatment in an effort to break the hinge of the bivalve in order to remove the meat from the shell. Frequently, however, the heat to which the scallop meats are subjected will be sufficiently high to affect or at least partially cook the adductor muscle at the ends which are normally secured to the inside of the shells and this partial cooking may be objectionable before evisceration or further processing. Also, presently there is no direct control exercised over the extent or duration of exposure of the scallops to elevated temperatures before scallop impact, and the entire mass of scallops together with scallop meats ejected from their shells will be processed at the same time and at the same elevated temperatures thereby resulting in non-uniformity of end product and variation in the quality of the processed product. Often the temperature of the scallop may be so high as to be sufficient to cook the scallop before processing and the product may not qualify as a fresh product.

Apparatus and method for the processing of scallops have been found to be at least partially successful in which scallops are subjected, in a land-based facility to live steam while the scallops are moved through a housing on a conveyor while attempting carefully to control the injection of steam at a volume and temperature depending upon the nature or condition of the harvested scallops to be processed. The heated scallops usually open at least partially at an elevated temperature with the extent of the opening varying depending upon the type of scallops, its age and condition, shell density, and insulating properties caused by barnacles and encrustations. The mass of scallops have been subjected to substantially the same heat treatment for the same time interval with some of the scallop meats being discharged prematurely to become at least partially cooked with respect to the adductor muscles before being discharged to a vibrating table which will separate the meats from the shells with some of the meats having already been separated. During vibration, the scallop meats are separated from the shells and all of the meats, with some that are partially cooked, are commingled irrespective of the degree of cooking of the adductor muscle for removal to a cleansing location where sand and other particles are deposited before transfer of the scallop meats to an evisceration operation for removing the viscera from the adductor muscles.

It is an objective of this invention to provide an apparatus and method for use on a ship or in a land-based facility in which the scallops are progressively subjected simultaneously to an elevated temperature and vibration while travelling in a directed path of travel for shucking, and removing the scallop meats from prolonged exposure at the elevated temperature to avoid cooking the adductor muscles of the scallop meats.

Another objective of this invention is the provision of an apparatus in which scallops are introduced and conveyed along a directed path of travel while being subjected to displacement to expose the maximum surface area of the scallop to elevated temperature and separation of the scallop meats progressively as they are removed from the shells to limit the exposure of the scallop meats to elevated temperatures, and removing the scallop meats from contact with heated scallops and shells.

Yet another objective of this invention is to provide an apparatus in which scallops are simultaneously heated and vibrated for exposure to elevated temperatures to remove the meat from the shells and progressively remove the scallop meats shortly after ejection from the shells to reduce the exposure time of the meats to elevated temperatures in order to avoid affecting or cooking the adductor muscles, and transporting the meats to an evisceration station for removal of the viscera from the adductor muscle.

Still a further objective of this invention is the provision of a method for processing scallops to remove the scallop meats by subjecting the scallops to an elevated temperature while agitating the scallops to expose the maximum scallop surface area to an elevated temperature to cause the meats to be removed from the shells, and progressively removing the meats from prolonged exposure to elevated temperatures to avoid affecting the adductor muscles in the scallop meats.

Other objectives and many of the attendant advantages of this apparatus for shucking scallops and the method of processing scallops will become more readily apparent to those skilled in the art of shucking bivalves from the following detailed description taken in conjunction with the accompanying drawing in which equivalents and modifications are contemplated in the attended claims.

BRIEF DESCRIPTION OF THE DRAWINGS

FIG. 5 is a side elevational view, with portions removed, of another embodiment of an apparatus for conveying, heating, vibrating, and separating scallop meats from shells;

FIG. 6 is a right end elevational view, with portions omitted, of FIG. 5;

FIG. 7 is a partial transverse sectional view, with portions omitted, taken along line 7—7 of FIG. 5; and FIG. 8 is an enlarged partial transverse sectional view, with portions omitted, taken substantially along line 8—8 of FIG. 5.

DETAILED DESCRIPTIONS OF PREFERRED EMBODIMENT AND METHOD

Figure 1:
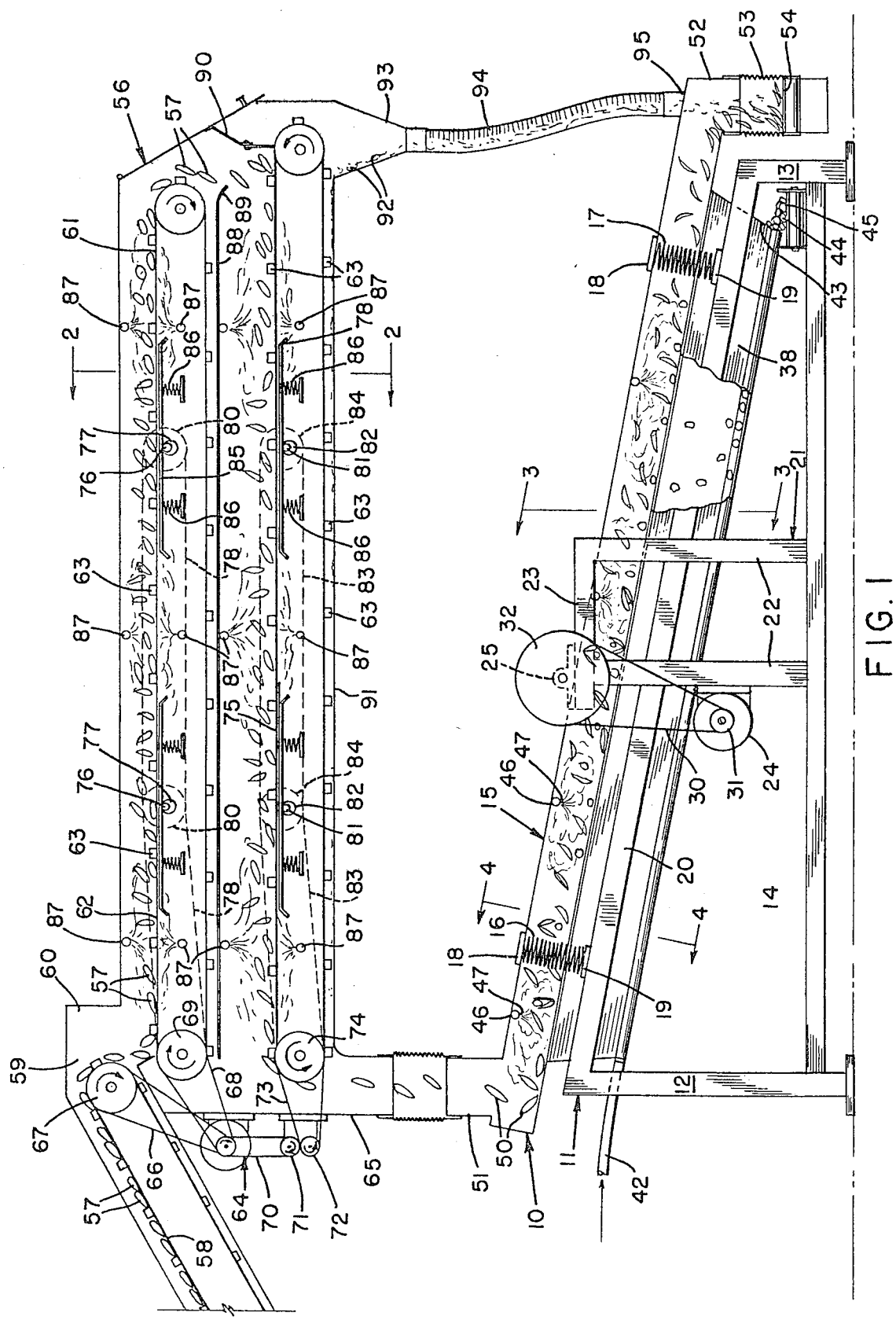
FIG. 1 is a side elevational view, with portions removed, of a first embodiment of an apparatus for conveying, heating, vibrating, shucking, and separating scallops and scallop meats.
Figure 2:
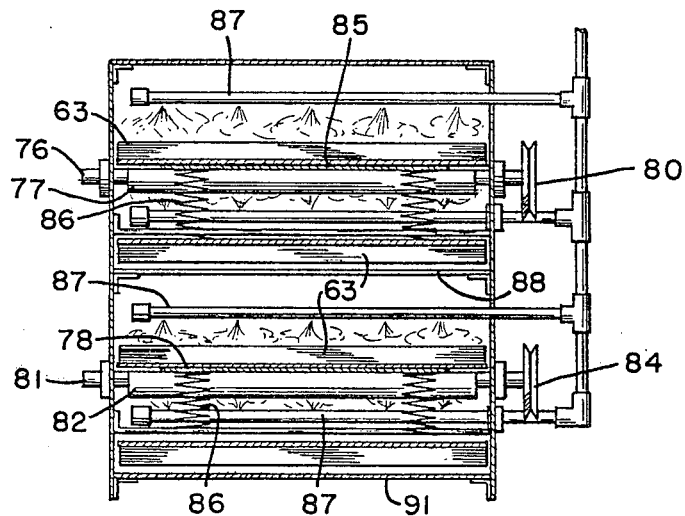
FIG. 2 is a partial transverse sectional view taken substantially along line 2—2 of FIG. 1 of the upper conveying, heating and vibrating section of FIG. 1.
Figure 3:
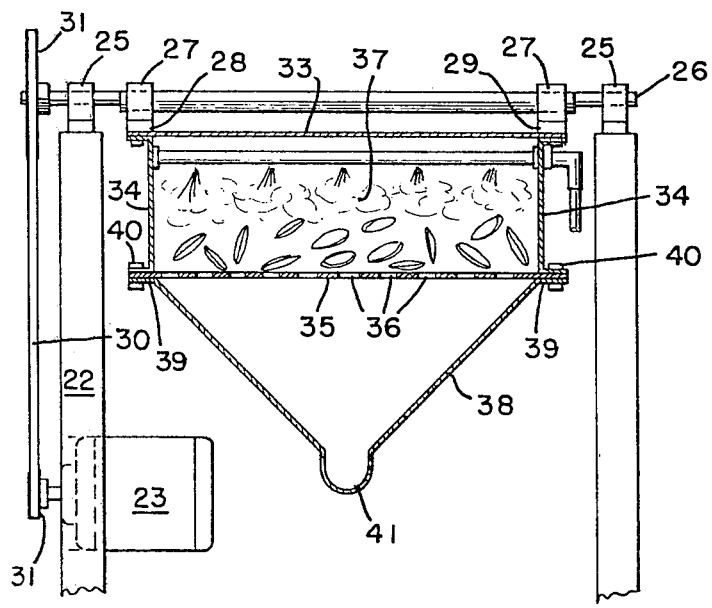
FIG. 3 is a partial transverse sectional view taken substantially along line 3—3 of FIG. 1 of the lower portion of FIG. 1.
Figure 4:
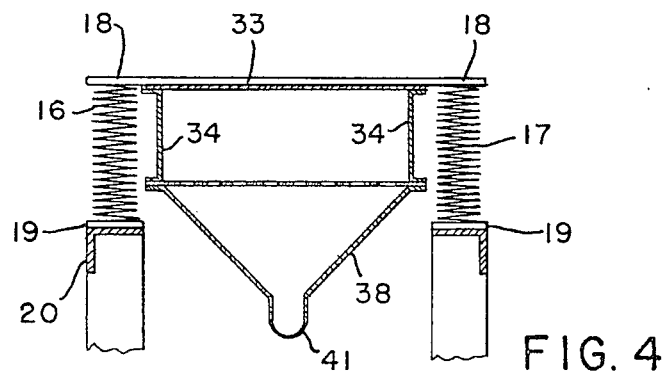
FIG. 4 is a slightly reduced sectional view taken substantially along line 4—4 of FIG. 1 of the lower section of FIG. 1 illustrating the spring mounting for the housing and conveyor means.

Referring to the drawings and particularly to FIGS. 1-4, there is illustrated a first embodiment of a combination scallop conveying, heating, vibrating and shucking apparatus 10 in which the supporting frame 11 is provided with vertical legs 12 and 13, and a horizontal leg-connecting member 14, on each side of the frame 11 which frame supports the downwardly inclined and elongated housing and scallop conveyor 15 resiliently through the helical springs 16 and 17 that are longitudinally-spaced from each other and mounted between the housing-supported pads 18 and the beam-mounted pads 19 to maintain the housing and conveyor 15 in spaced relation to the inclined beam 20.

An auxiliary frame 21 is provided with a pair of spaced-apart vertical legs 22 and a horizontal crossbeam 23 at each side of the housing and conveyor 15 to support the electric motor and mounting 24 on one of the legs 22, and a shaft-bearing block 25 is mounted on each cross-beam 23 in which bearing blocks 25 the driven shaft 26 is rotatably supported. Shaft 26 has eccentric portions 27 securely mounted thereon to vibrate the housing and conveyor 15 by engaging the side rails 28 and 29 that are mounted on the upper outside surface of the housing and conveyor 15 through the suspension of the housing and conveyor 15 through the helical springs 16 and 17 mounted on the inclined beam 20. A V-belt 30 is driven by the pulley 31 on the motor 24 to drive the pulley 32 that is keyed to the driven shaft 26 on which the eccentrics 27 are mounted.

The housing and conveyor 15 has an upper wall 33, side wall 34, and a removable bottom plate 35 which plate is provided with a plurality of spaced openings 36 through which scallop meats may pass readily downwardly out of chamber 37 formed by the top wall 33, the side walls 34, and the bottom plate 35. The chamber 37 will be heated and maintained at an elevated temperature during operation in a manner to be described hereafter.

A substantially V-shaped meat collector extends longitudinally beneath the bottom plate 35 and is secured together with the bottom plate through the flanges 39 that cooperate with the flanges 40 in the side walls 34 through which flanges and bottom plates suitable fastening bolts (not shown) secure the bottom plate 35 and the meat collector 38 to the flanged side walls 34. The substantially U-shaped bottom section 41 of the meat collector 38 may be provided with water or steam injection under pressure through the inlet line 42 to augment the flow of scallop meats down the inclined meat collector 38. Flushing the meat collector 38 periodically for cleansing when necessary will facilitate the flow of scallop meats downwardly into the bottom 41 of the collector 38. In some applications it may be advantageous to utilize hot water where in other applications steam may be desirable depending upon the nature of the scallop meats and the condition of operations. The scallop meats will be urged downwardly to the scallop meat discharge 43 at the lower end of the housing and conveyor 15 for depositing the scallop meats 44 on a conveyor belt 45 that is conventionally driven to convey the scallop meats 44 to a cleansing flume (not shown) which is remotely located and may contain a brine solution for removing shell particles and grit from the scallop meats before depositing the cleansed scallop meats on an eviscerator of the type described in U.S. Pat. No. 3,829,933 to remove the viscera from the adductor muscle.

It has been determined that live scallops which have been recently removed from their habitat will have their bivalves closed tightly through their hinges with the adductor muscles which are attached to the inside of the bivalve contracting to maintain the scallop tightly closed particularly when subjected to some processing including being subjected to hot water. Some scallops which are either dead, dormant or those that have been out of water for a prolonged period of time may be opened rather readily with almost negligible impact at relatively low temperatures permitting the bivalves to open readily and the scallop meat will be ejected or fall out quite readily. However, some scallops which are fresh, and particularly those that have been removed from the water for a relatively short period of time, and those which have barnacles or other encrustations which insulate the shells, require more intense heat for longer durations with the heat application preferably being over the entire surface of the scallop shell which is believed to loosen the adductor muscle by having it contract sufficiently to release the hinge of the bivalve by becoming detached from the shell causing the scallop to open and permit the meat therein to be released upon further vibration and displacement with some striking of the scallops against each other or against the bottom plate 35 within a relatively short distance. For the purpose of this description, where the term "vibration" is utilized, it is intended to include random displacement of the scallop whether vertical, lateral, curvilinear or rectilinear displacement which may include a short vertical distance of travel or travel at any angle during which the scallops are subjected to vibratory movement and will be subjected to elevated temperatures during which the scallops during vibratory displacement will have a maximum area of their shells exposed to elevated temperatures as much as is possible in such movement recognizing that the temperatures will not penetrate uniformly through all scallop shells in a mass of scallops due to their varying densities, thicknesses, and deposits thereon.

A series of headers 46 is positioned at longitudinally-spaced locations in the housing and conveyor 15 in which the individual headers 46 extend transversely into the chamber 37 with each of the headers 46 being connected to a manifold (not shown) for supplying heated fluids under suitable pressure as from a remotely located boiler or steam source (not shown). The heated fluid is preferably live steam which may be appropriately throttled, depending upon the initial pressure, to flow into each of the headers 46, and the steam will flow through spaced openings 47 in the headers 46 into the chamber 37. The heated fluid may include hot water or other suitable liquid including a brine solution provided the scallops will not be contaminated, however, live steam injected at elevated temperatures is most desirable. The temperature range within the chamber 37 may vary considerably depending upon the characteristics of the heated fluid and the desired temperature range to which the scallops must be heated which may range from approximately 190° F. to 220° F. or higher depending upon the interval of time of exposure of the scallops and their rate of travel through the housing and conveyor 15 as well as the preheating cycle to which the scallops may be subjected. The interval of time may range from approximately ten seconds to five minutes or longer depending upon the condition of the scallops to be shucked. Fresh, live scallops will be more difficult to shuch particularly those which have barnacles and other insulating encrustations as opposed to scallops which have been removed from water for a prolonged period of time and may require less heat for shorter time periods. The size of the scallops, their age, the density of their shells, and their heat conductivity will be some of the factors determining the amount of time and the temperature required for shucking as well as the frequency of the vibratory action to which the scallops are subjected. Since individual scallops in a mass of scallops will vary considerably, each from the other, it is important in order to maintain uniform quality of the end product not to subject the scallop meats to elevated temperatures for prolonged periods and to limit the exposure time of the scallop meats to elevated temperatures thereby avoiding any harmful affect to the adductor muscle by cooking or even some partial cooking. Therefore, it is highly important to remove the scallop meats from prolonged exposure to elevated temperatures in the chamber 37 as rapidly as possible by passing them through the opening 36 in the bottom plate 35 and from further contact, as much as can be possible, with other heated scallops and shells. The removed scallop meats will pass progressively as the scallops are opened to discharge the meats through the openings 36 for those scallops that are shucked more readily at the upper portion of the inclined housing and conveyor 15 with those scallops more difficult to be shucked being opened at the lower end of the housing and conveyor 15 after being subjected to longer periods of heating at elevated temperatures, agitation and vibration for shucking.

The resiliently-supported housing and conveyor 15 will be vibrated continuously upon actuation of the motor 24. It is desirable before introducing a load of scallops 50 into the scallop-receiving inlet duct 51 that the housing and conveyor 15, when utilized without a preheating chamber, should be preheated by supplying steam through the headers 46 which will inject steam through the openings 47 into the chamber 37 to preheat the chamber to the desired temperature. The vibratory motion imparted to the housing and conveyor 15 through the eccentrics 27 on shaft 26 will cause the scallops 50 to be moved downwardly in their directed path of travel through chamber 37 to be agitated and moved randomly at various angles to expose a maximum surface area of each scallop to the elevated temperature in the chamber 37 and to the vibrations to the extent sufficient to open the scallops and have the meats removed therefrom. As the scallop meats are removed from the scallops, they will pass through the closest openings 36 in the bottom plate 35 and out of contact with the highest temperature region in the chamber 37 to the considerably lower temperature region in the collector 38 and also out of direct contact with other heated scallops and shells which pass downwardly over the openings 36 in the bottom plate 35 to be discharged from the shell-discharge duct 52 that is provided at the lower end with a flexible, corrugated sleeve 53 that encloses a portion of a travelling belt conveyor 54 which is conventionally operated for removing the shells and other debris for deposit to a remote location.

It is highly desirable that the entire housing and conveyor 15 be properly insulated to retain the heat in the chamber 37 with the type and depth of insulation to be employed varying with the materials available and the cost of installation.

The scallop preheater and conveyor apparatus 56 may be provided as required for a particular installation above the housing and conveyor 15 for use in those scallop shucking applications where additional heat and vibration may be required whether aboard ship or in land installations. It will be readily apparent that the particular orientation and design of the preheater and conveyor 56 will vary depending upon the spaced limitations available and a single flight or a plurality of flights may be incorporated. In the embodiment illustrated in FIGS. 1-4, two separate flights of conveyors are positioned one above the other but they could very well be used in tandem or in a side-by-side relationship. Scallops 57 to be preheated and shucked are loaded on the inlet endless delivery conveyor 58 that is an inclined position to elevate the incoming scallops 57 to discharge them into the inlet 59 of the preheater enclosure 60 to deposit the load of incoming scallops 57 on the upper flight 61 of the top endless reticulated conveyor belt 62 that is provided with spaced vertically-projecting rods 63 for separating the scallops 57 and attempting preferably to maintain them at a substantially uniform level of one scallop layer during flight in the directed path of travel from left to right.

A variable speed motor-driven mechanism 64 is mounted to the side wall casing 65 of the preheater enclosure 60 to drive a series of belts for the various conveyors and eccentrics. Drive belt 66 from the drive mechanism 64 will rotate the inlet conveyor pulley 67. Drive belt 68 from the drive mechanism 64 will drive the pulley 69 to actuate the upper flight conveyor 61 in its directed path of travel from left to right in the upper flight. Drive belt 70 from the drive mechanism will rotate the pulley 71 which in turn will rotate the pulley 72 on which the drive belt 73 is mounted to rotate the pulley 74 to actuate the endless conveyor flight 75 from right to left.

The upper flight conveyor 61 is provided with spaced shaft 76 which are bearingly supported in the casing 60 and each shaft has an eccentric 77 mounted thereon with the shaft 76 being driven by the belt 78 from the pulley 69 which belt 78 drives the pulleys 80 mounted on the shaft 76. Similarly, the bottom conveyor flight 75 is provided with shafts 81 that are spaced from each other along the bottom of the lower flight 75 and the shafts are bearingly supported in the casing 60 and have eccentrics 82 mounted thereon. The shaft driving belt 83 engage the shaft mounted pulleys 84 and are driven from the pulley 74 causing the conveyor flight 75 to move from right to left.

Associated with each eccentric 77 and positioned directly above it is a plate 85 which is supported resiliently by spaced helical springs 86 for augmenting and supporting the conveyor belt during vibration produced by the rotation of the shaft 76 through the eccentrics 77 as the conveyor belt 61 travels from left to right to vibrate and move the scallops 51 in random directions to expose the maximum surface of the scallops to elevated temperatures from the series of spaced inlet heated fluid lines 87 which I provided with spaced openings (not shown) through which the heated fluid, such as steam, will be injected into the housing 60 at an appropriate temperature depending upon the preheating conditions required in the preheater and conveyor 56 depending upon the nature and condition of the scallops to be shucked.

In the flow of scallops 57 in the first flight in the preheater and conveyor 56, the temperature within the housing 60 is elevated through the use of a heated fluid injected through the line 87 to subject the scallops to the elevated temperature within the housing 60 with the scallops being agitated and vibrated as they move in a directed path of travel by means of the eccentric 77 on the shaft 76 to vibrate the conveyor belt 62 at spaced intervals preconditioning the scallops for further treatment preferably before separation of the scallop meats from the shells. The preheated and vibrated scallops 57 are discharged from the end of the conveyor flight 61 and fall downwardly within the casing 60 onto the conveyor belt 75 which is also provided with transversely extendings bars 63 that are spaced at suitable intervals and mounted on the conveyor 75 that is positioned beneath the division plate 88 which extends longitudinally between the upper and lower conveyor flight and is provided with a baffle edge 89 for deflecting the falling scallops 57 and directing them onto the conveyor belt 75. A flexible baffle 90 is provided directly above the lower flight and in spaced relation to the baffle edge 89 to control the displacement of the falling scallops 57 by directing them to the conveyor belt 75 below. Broken shells and debris will also fall onto the lower conveyor belt 75. The scallops 57 will be subjected to additional vibration through the eccentrics 72 mounted on shaft 81 through the resiliently mounted plate 78 positioned at spaced intervals under the conveyor belt 75 with steam being injected above and below the belt 75 to heat the vibrated and agitated scallops 57 continuously as they pass along a directed path of travel from right to left and expose a maximum surface to the elevated temperatures within the preheater. Broken shells, sand, and other debris that fall downwardly to the bottom wall 91 of the housing will be scraped by the conveyor supported bar 63 to deposit such materials 92 into the downwardly extending chute 93 and the flexible connector duct 94 that is connected to the inlet opening 95 at the discharge end of the housing and conveyor 15 to be commingled with the shells that are discharged from the housing and conveyor 15 for disposal therewith in the conveyor 54.

Referring to FIGS. 5–8, there is illustrated another embodiment of a scallop shucking apparatus 96 in which the incoming scallops 97 to be shucked are conveyed into a preheater housing or chamber 98 of the type shown in FIG. 1, with only a portion thereof illustrated, and depicting a portion of a single endless conveyor flight 99 in which the conveyor belt 100 is supported and conveyed in a manner similar to that which has been described previously for the scallop preheater and conveyor 56 shown in FIG. 1. The same type of fluid supply lines 101 are positioned above and below the conveyor belt 100 that supports the scallops 97 to be preheated and ultimately shucked with the lines 101 injecting heated fluids, such as steam, into the conveyor housing 102 to impinge upon the scallops 97 that are agitated and vibrated continuously by the eccentric 103 mounted on shaft 104 through the guide plate 105 over which the conveyor belt 100 will travel with the plate 105 being supported resiliently by means of the spaced-apart helical spring 106.

The heated and vibrated scallops 97 are discharged from the preheater chamber 98 into the discharge duct 107 that serves as an inlet hopper to receive and discharge preheated scallops 97 from the duct outlet 108 into a revolving cylindrical drum 109 that is mounted for rotation about its axis in an inclined position as shown in FIG. 5.

Drum 109 is provided with a plurality of openings 110 in the drum shell through which scallop meats 111 may pass readily and progressively into a scallop meat-receiving trough 112. The trough 112 extends longitudinally beneath the drum 109 for collecting scallop meats discharged into it, and the scallop meats will pass downwardly along the inclined path to the meat discharge opening 113 where the scallop meats 111 will be discharged onto an endless conveyor belt 114 for conveyance to a cleansing tank or flume (not shown) through which water or a brine solution will flow to remove shell particles, sand and grit before evisceration where the viscera is separated from the adductor muscle on an apparatus preferably on the type disclosed in U.S. Pat. No. 3,829,933.

The drum 109 is mounted to revolve in an outer cylindrical casing 115 that is suitably lagged or covered with insulation 116. An axial shaft 117 is bearingly supported and provided with drum-supporting spiders 118 that are axially spaced from each other to support the drum 109 for rotation within the casing 115 through the seal and coupling 119, and a driven pulley 120 is supported on the protruding end of shaft 117 to receive the driving belt 121 which is driven by pulley 122 that is mounted on the variable speed drive motor 123 which is suitably secured to the top of the casing 115.

A series of radially-projecting baffle plates 124 is mounted in circumferentially-spaced relationship with the interior of drum 109 to displace and agitate the scallops 97 as they pass longitudinally through the drum 109 in a direct path of travel. A longitudinally-extending header or pipe 125 is positioned within the annular space 126 between the casing 115 and the drum 109 with openings 127 being provided in the header 125 through which the heated fluid, preferably live steam, may be injected into the annular space 126 for penetration into the drum 109 through the drum openings 110 to subject the scallops 97 to an elevated temperature in the temperature range of from approximately 190° F. to approximately 220° F. for a period of time depending upon the condition of the scallops to be shucked.

Drum 109 is provided at the entrance end 128 with a bearing and sealing ring 129 for cooperation with the circular bearing flange 130 that is securely mounted on the end plate 131 of the casing 115. The ring 129 and flange 130 will reduce the exhaustion of steam or other heated fluids at the inlet end other than to be vented through the duct inlet 108 to pass into the duct 107 to maintain the scallops 97 which have been preheated at an elevated temperature before being discharged into the drum 109 for further processing and shucking. The heated fluid entering header 125 will flow through the inlet line 132 and will be supplied from a suitable boiler located remotely from the shucking apparatus at an appropriate pressure and temperature for utilization within the drum 109.

A steam or water supply line 133 will admit the desired fluid into the meat collector 112 should it be necessary to urge the flow of scallop meats 11 downwardly to the scallop meat discharge 113.

Shells 134 from which the scallop meats 111 have been removed will not pass through the drum openings 110 but will flow or be urged downwardly during drum rotation and vibration to the open end 135 of the drum 109 through a discharge opening 136 in the casing 115 which may be suitably covered to prevent excess exhaustion of the heated fluid and to maintain the elevated temperature in the drum 109 during the shucking operation. The shells 134 will be deposited onto the conveyor belt 137 of an endless conveyor mechanism 138 for discharge at a remote location together with any shell particles and debris which may be discharged with the shells 134.

Drum 109 and casing 115 in the apparatus 96 are supported by the framework 139 in which the vertical legs 140 at the inlet end are provided with a pivot connection 141 extending from the drum casing 115 which will permit the axis of the apparatus 96 to be raised and lowered and to accomodate through bearings (not shown) within the pivot connection 141 oscillation of the apparatus 96 during vibration. The rear legs 142 support bearings 143 for retaining the rotatable shaft 144 therein on which shaft 144 the eccentric 145 is mounted. Shaft 144 is driven by the belt 146 through the pulley 147 that is keyed to the shaft 144 with the belt 146 being driven from the pulley 148 which is mounted on the electric motor and shaft 149. Motor 149 is mounted on the horizontal beam 150 which is part of the framework 139.

A bearing member 151 engaged the eccentric 145 mounted on shaft 144 and is connected to the cylinder housing 152 in which a hydraulically-operated piston 153 is vertically displaceable through conventional means with the piston rod 154 being connected to the yoke 155 that is pivotally connected to blocks 156 secured to the lower section and bottom portion of the casing 115. Blocks 156 are each provided with a stub shaft 157 each of which protrudes to receive for pivotal movement or oscillation therein the opening 158 in the upper end 159 of the yoke 155.

The motor 149 will drive the eccentric 145 through the shaft 144 to vibrate the drum 109 and casing 115 through the hydraulic housing 152 and yoke 155 with the vibration of the drum 103 and casing 109 also being pivoted or oscillated through the pivot connection 141 at the inlet end of the apparatus 96. The vibratory motion produced through the eccentric 145 of the drum 109 will augment the displacement and agitation of the scallops 97 as they pass through the elevated temperature within the drum 109 and casing 115 thereby subjecting the incoming scallops 97 to an elevated temperature and vibratory action to open the scallops 97 causing them to release the scallop meats 111 therefrom progressively depending upon the condition of the scallops 97 in the path of travel from inlet to discharge. The scallop meats 111 are removed as rapidly as possible from within the revolving drum 109 to avoid prolonged exposure to the elevated temperature in the drum 109 and casing 115 by passing through the scallop meat openings 110 in the drum 109 for prompt discharge into the scallop meat collector 112 and out of the high temperature range for ultimate discharge onto the conveyor belt 114 through the discharge opening 113 at the lower end of the collector 112.

It is highly desirable that the scallop meats 111 be separated as rapidly as possible from contact with heated scallops and shells from which the meats have been removed so that the temperature of the meats will not be subjected for any prolonged periods of time to the elevated temperatures in order to avoid cooking or partial cooking or affecting the adductor muscles adversely. The viscera surrounding the adductor muscles may provide some insulation initially although the ends of the adductor muscle may be exposed to elevated temperatures for a short period of time. Therefore, it is highly desirable to remove the scallop meats 111 progressively as rapidly as possible when they are dislodged or ejected from the scallops in the directed path of travel of the mass of scallops during vibratory movement progressively depending upon the condition of the scallops. Thus, in contrast to the present procedures, scallop meats that are removed readily at the commencement of the shucking operation will not remain commingled with the mass of scallops and subjected to prolonged heating at elevated temperatures while the scallop meats from scallops that are more difficult to shuck are extracted and will receive different increments of exposure time to elevated temperatures without encountering the harmful or objectionable effects of cooking or partially cook or affecting the adductor muscles adversely.

In carrying out the process of this invention, whether utilizing the apparatus shown and described in FIGS. 1-4 or as shown in FIGS. 5-8, or any other apparatus which may accomplish the process, scallops to be shucked are conveyed along a directed path of travel. While being conducted along the directed path of travel, the scallops are subjected simultaneously to an elevated temperature in the range of approximately 190° F. to 220° F., more or less, depending upon the condition of the scallops and simultaneously subjected to a random agitation motion or vibration to displace the scallops for exposing the maximum surface area of the scallops, within a relatively short period of time, to an elevated temperature while the scallop is in motion causing the scallop to open and thereby release the scallop meat from the shell. The scallop meats are rapidly removed from the original directed path of travel and away from prolonged contact with the elevated temperature and further vibration and contact with other scallop shells and scallops so the scallop meats will not be subjected to prolonged periods of exposure to elevated temperatures in order to avoid undue cooking or partial cooking or affecting the adductor muscle adversely. The interval of time for exposure of the scallops with the meats therein will vary considerably depending upon the nature and condition of the scallops to be processed, and the time interval may vary considerably from a minimum of approximately ten seconds to approximately five minutes or longer. However, once the scallop meats are ejected or removed from their shells, they are rapidly removed from exposure to elevated temperatures and vibratory motion for collection and displacement for evisceration to yield the high quality adductor muscle.

I claim:

1. Apparatus for shucking scallops and separating scallop meats from scallop shells comprising; a base supporting frame, a housing and scallop conveying means mounted on said frame, said housing and scallop conveying means having a scallop-receiving inlet and a shell-discharging outlet, means for moving said scallops while traveling along a directed path of travel between said inlet and said outlet in said housing and scallop conveying means to expose a substantial area of the scallops, means for supplying heated fluid into said housing and scallop conveying means to elevate the temperature therein to heat a substantial area of the moving scallops as they travel in said directed path of travel on said scallop conveying means, and means in said housing and scallop conveying means for removing scallop meats released from scallop shells out of the directed path of scallop travel and away from said elevated temperature before the shell discharging outlet in the heated directed path of travel and from out of engagement with heated scallop shells for discharge in one direction while retaining scallop shells for discharge through said shell-discharging outlet in another direction from the direction of said released scallop meats.

2. Apparatus for shucking scallops and separating scallop meats from scallop shells as claimed in claim 1, and means for collecting scallop meats discharged progressively from said housing and scallop conveying means.

3. Apparatus for shucking scallops and separating scallop meats from scallop shells as claimed in claim 1, a scallop-receiving conveyor for discharging scallops to said housing and scallop conveying means and having at least one flight, a housing enclosing said flight, means for supplying heated fluid into said housing, means for moving said scallop-receiving conveyor along a directed path of travel, means for vibrating scallops on said scallop-receiving conveyor to displace the scallops thereon in random movement to expose a maximum surface of each scallop to the heated fluid at an elevated temperature.

4. Apparatus for shucking scallops and separating scallop meats from scallop shells as claimed in claim 1, said housing and scallop conveying means having top and side walls and a bottom plate having openings therein through which scallop meat may pass with said openings being too small to pass scallop shells therethrough, said vibrating means including a motor-driven eccentric shaft mounted on said housing and scallop conveying means, resilient means mounted at spaced intervals for resiliently supporting said housing and said scallop conveying means to said frame whereby the vibrated scallops will be subjected to elevated temperatures of said heated fluid means to cause the scallops to be heated uniformly causing them to open and release the scallop meats progressively in said housing and scallop conveying means depending upon the condition of the scallops whereby the scallop meats are rapidly removed from the elevated temperatures in said housing and scallop conveying means through said openings in said bottom plate and out of further contact with the heated scallop shells.

5. Apparatus for shucking scallops and separating scallop meats from scallop shells as claimed in claim 1, said housing and scallop conveying means being elongated to form a trough through which scallops may be conveyed in an inclined path downwardly from said scallop-receiving inlet to said scallop-discharging outlet, said scallop-receiving inlet and said shell-discharging outlet being positioned at opposite ends of said trough, a scallop-receiving hopper for receiving scallops discharged therein for communication with said trough for conveyance therethrough, said shell-discharging outlet having a duct connected to said trough to discharge shells, means for receiving and conveying said discharged shells to a remote location, said means for vibrating said housing and scallop conveying means being connected and having resilient means mounted on said trough and said frame at spaced intervals for yieldably supporting said trough for vibration, a bottom plate in said trough having a plurality of spaced openings through which scallop meats may pass without passing scallop shells therethrough, means for collecting scallop meats beneath said bottom plate as said meats are removed from the shells to avoid prolonged contact with the elevated temperature in said housing and scallop conveying means and heated shells in said trough, said heated fluid injecting means including a series of nozzles spaced along said trough for introducing steam into said trough to elevate the temperature therein and subject the scallops to steam heat while being randomly displaced and vibrated causing the meat to be dislodged from their heated shells and fall through said plate openings whereby the meats of the scallops more readily shucked at lower scallop temperatures are removed before the meats of the scallops which require more heat and vibration while removing the meats from the elevated temperatures and contact with heated shells as rapidly as possibly through said bottom plate openings.

6. Apparatus for shucking scallops and separating scallop meats from scallop shells as claimed in claim 1, said housing and scallop conveying means being cylindrical and having an outer insulated casing and an inner rotatable drum, said inner rotatable drum having means for supporting said drum for rotation, said drum having a scallop-receiving inlet and a shell-discharging outlet and a plurality of openings through which scallop meats will pass readily while preventing passage of scallop shells therethrough, a plurality of radially projecting shell-displacing means circumferentially spaced from each other and mounted on the drum inner surface, means for rotating said drum within said insulated casing, said means for supplying heated fluid into said housing and scallop conveying means including a header having a plurality of longitudinally-spaced openings to admit steam into said housing and scallop conveying means to heat the scallops sufficiently while they are being moved to release the scallop meats from the scallop shells with the meats passing through said openings in said drum away from the elevated temperature in said housing and scallop conveying means and away from the heated shells, said shells being conveyed longitudinally to said shell-discharging outlet, said housing and scallop conveying means being inclined downwardly from said scallop-receiving inlet to said shell-discharging outlet, means on said frame for supporting the casing in spaced relation to said shell-discharging outlet, said casing supporting means having means for reciprocating said frame supporting means to vibrate said casing and rotatable drum with the scallops passing through said drum, means for partially sealing said scallop-receiving inlet from escape of steam whereby scallops are progressively opened releasing meats therefrom depending upon the scallop condition and the requisite heat and vibration and movement required therefore, and removing the meats directly through said openings in said drum to avoid prolonged heating or cooking of the meats.

7. Apparatus for shucking scallops and separating scallop meats from scallop shells as claimed in claim 6, a scallop-receiving conveyor for discharging scallops to said housing and scallop conveying means having at least one flight, a housing enclosing said flight, means for injecting heated fluid into said housing, means for moving said scallop conveying means along a directed path of travel, means for vibrating scallops on said scallop-receiving conveyor while moving said scallops in a directed path of travel through said housing at elevated temperatures before discharging said scallops into said housing and scallop conveying means.

* * * * *